United States Patent Office 3,492,291
Patented Jan. 27, 1970

1

3,492,291
BENZYLOXYCARBONYLBENZYLPENICILLINS
AND THEIR CATALYTIC HYDROGENATION
Edward George Brain, London, and John Herbert Charles
Nayler, Dorking, Surrey, England, assignors to Beecham
Group Limited, Middlesex, England, a British company
No Drawing. Original application Apr. 17, 1964, Ser. No.
360,760, now Patent No. 3,282,926, dated Nov. 1, 1966.
Divided and this application May 3, 1966, Ser. No.
547,192
Int. Cl. C07d 99/16; A61k 21/00
U.S. Cl. 260—239.1     2 Claims

ABSTRACT OF THE DISCLOSURE

Benzyloxycarbonylbenzylpenicillins and their salts are disclosed and particularly α - (benzyloxycarbonyl)benzylpenicillin and its sodium salt. These are important intermediates for the production of carbenicillin and the conversion of those compounds to carbenicillin by catalytic hydrogenation is disclosed, such catalytic hydrogenation being carried out under mild conditions of temperature and pressure; i.e., at room temperature and pressure at a pH from 5 to 9 to avoid rupture of the penicillin nucleus.

This application is a division of application Ser. No. 360,760 filed April 17, 1964, (now Patent No. 3,282,-926).

This invention relates to new penicillins and is particularly concerned with a new class of pencillins which are derivatives of 6-aminopenicillanic acid and which are of value as antibacterial agents, as nutritional supplements in animal feeds, as agents for the treatment of mastitis in cattle and as therapeutic agents in poultry and animals, including man, in the treatment especially of infectious diseases caused by Gram-positive and Gram-negative bacteria.

According to the present invention there is provided new penicillins of the general formula:

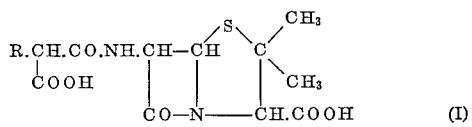

and non-toxic salts thereof, where R is an alkyl, phenyl, substituted phenyl or heterocyclic group.

The salts are non-toxic salts including non-toxic metallic salts such as sodium, potassium, calcium and aluminum, ammonium and substituted ammonium salts, e.g. salts of such non-toxic amines as trialkylamines, including triethylamine, procaine, dibenzylamine, N-benzyl-β-phenethylamine, 1-ephenamine, N,N' - dibenzylethylenediamine, dehydroabietylamine, N,N' - bis - dehydroabietylethylenediamine, and other amines which have been used to form salts with benzylpenicillin.

A preferred compound has the general Formula I above where R is a phenyl group. Suitable heterocyclic groups include α- and β-furyl and α- and β-thienyl.

The present invention also privdes a process for the preparation of penicillins of the general Formula I which process comprises coupling 6-aminopenicillanic acid or a salt thereof with a reactive derivative of an acid of the formula:

where R is as defined above and X is a hydroxy group or chlorine atom or the group OR' where R' is an alkyl, aryl, benzyl or substituted benzyl group which is subsequently removed.

2

The reactive derivative of the acid (II) is the acid halide, anhydride or any of the compounds classed as mixed anhydrides in accordance with Albertson, Organic Reactions, (1962) 12, 157.

The removal of the group R' may be effected by catalytic hydrogenation, e.g. when R' is an aryl, benzyl or substituted benzyl group, enzymatically, e.g. when R' is a methyl or ethyl group, or by mild treatment with acid, e.g. when R' is a t-butyl group.

When the removal of the group R' to form the free penicillin is effected by catalytic hydrogenation, e.g. by allowing the protected derivative to react with hydrogen in the presence of a catalyst, the hydrogenation is normally carried out at room temperature and at atmospheric pressure, the pH of the reaction mixture being from 5 to 9. The solvent for the hydrogenation reaction is normally water, but other non-reducible solvents such as ethyl alcohol or dioxane or mixtures of these with water may be employed.

The preferred hydrogenation catalyst is palladium but other catalysts such as nickel, platinum or rhodium may be used. The catalyst may be employed on an inert support, e.g. of barium carbonate or carbon.

A complication which sometimes arises in the preparation of the new penicillins of the present invention is due to the well-known tendency of malonic acid derivatives to undergo decarboxylation under certain conditions, such as when heated. If such a side-reaction occurs at one of the intermediate stages, it may result in the final penicillin being contaminated with the decarboxylated analogue of the formula:

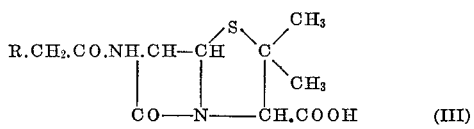

When such a second penicillin is present it can be readily detected by paper chromatography. The presence of the decarboxylated penicillin (III) as an impurity in (I) will not necessarily be a disadvantage, but if it is desired to remove the contaminating penicillin, this can be accomplished in various ways by taking advantage of the known properties of such penicillins. Thus in some cases the separation may be effected by column chromatography or by recrystallization. In other cases the decarboxylated penicillin (III) may be extracted into a suitable organic solvent at pH 2.5 to 4, conditions under which the main product (I) remains substantially in the aqueous phase. Yet another method is to incubate a solution of the mixed penicillins with a suitable enzyme, such as the amidase produced by certain strains of *Escherichia coli*, which degrades the penicillin (III) to 6-aminopenicillanic acid while leaving the penicillin (I) essentially unattacked.

Since some of the antibiotic substances obtained by the process of this invention are relatively unstable compounds which readily undergo chemical changes resulting in the loss of antibiotic activity, it is desirable to choose reaction and isolation conditions which are sufficiently moderate to avoid their decomposition.

The invention is illustrated by the following nonlimitative examples.

EXAMPLLE 1

α-Carboxybenzylpenicillin

Monobenzyl phenylmalonate (13.3 g.) in dry benzene (100 ml.) was refluxed with thionyl chloride (6.45 g.) for 90 minutes, then concentrated in vacuo. The residual oil was dissolved in dry acetone (50 ml.) and added to a stirred, ice-cooled solution of 6-aminopenicillanic acid (9.7 g.) in N sodium bicarbonate solution (135 ml.)

water (150 ml.), and acetone (300 ml.). The mixture was stirred for 30 minutes at 0° and then for 90 minutes at room temperature, then concentrated under reduced pressure to remove acetone. The aqueous solution was brought to pH 2 with dilute hydrochloric acid and extracted with ether (3×100 ml.). The ether solution was washed with water and then itself extracted with sufficient N sodium bicarbonate solution to give an aqueous phase of pH 7.5. The aqueous layer was separated and evaporated at low temperature and pressure to leave the impure sodium salt of α-(benzyloxycarbonyl)benzylpenicillin.

This crude product (15.8 g.) in water (360 ml.) was added to a pre-hydrogenated suspension of 10% palladium on charcoal (4 g.) in water (400 ml.), and hydrogenation was continued for 30 minutes. The catalyst was removed and the filtrate was adjusted to pH 7.5 with sodium bicarbonate, then evaporated at low temperature and pressure. The residue was purified by chromatography on a column of cellulose powder, eluting first with butanol/ethanol/water mixture and then with acetone/isopropanol/water. The main fraction was evaporated at low temperature and pressure to give a 32% yield of the sodium salt of α-carboxybenzylpenicillin as a white powder. The product was estimated by manometric assay with penicillinase to be 58% pure.

The required monobenzyl phenylmalonate M.P. 68°, was prepared by treating a mixture of phenylmalonic acid (18 g.) and benzyl alcohol (13 g.) in carbon tetrachloride (80 ml.) with dry hydrogen chloride.

EXAMPLE 2

α-Carboxybenzylpenicillin

The proceudre of Example 1 was improved by the use of milder conditions in the conversion of monobenzyl phenylmalonate to the crude acid chloride. Thus, monobenzyl phenylmalonate (2.7 g.) and thionyl chloride (5 ml.) were heated in a water-bath at 65° until reaction ceased (about 1 hour), then the excess reagent was removed in vacuo (finally by co-distillation with dry benzene) keeping the temperature below 65°. Reaction with 6-aminopenicillanic acid (2.16 g.) essentially as in Example 1 then gave 4.2 g. of the sodium salt of α-(benzyloxycarbonyl) benzylpenicillin, which was estimated by colorimetric assay with hydroxylamine to be about 78% pure.

A specimen of this salt (1 g.) in water (25 ml.) was added to a prehydrogenated suspension of 5% palladium on calcium carbonate (2 g.) in water (25 ml.) and hydrogenated at room temperature and pressure until absorption of hydrogen ceased (about 45 minutes). The mixture was filtered and the filtrate covered with ether (30 ml.) and treated with N hydrochloric acid to pH 2.3. The layers were separated and the aqueous phase was extracted with more ether (3×30 ml.). The combined ether extracts were washed with water (10 ml.) and extracted with sufficient N sodium bicarbonate solution to give an aqueous phase of pH 7.

Evaporation of the neutral aqueous solution at low temperature and pressure left the disodium salt of α-carboxybenzyl-penicillin in 68% yield, the purity being estimated by colorimetric assay with hydroxylamine to be about 79%. Further purification by column chromatography was considered unnecessary because paper chromatography indicated that the proportion of contaminating benzylpenicillin was only about 0.1%.

EXAMPLE 3

α-Carboxybenzylpenicillin

Phenylmalonic acid (25 g., 0.140 mole) in dry ether (500 ml.) was treated with thionyl chloride (17.35 g., 0.145 mole) and a trace of dimethylformamide. The mixture was refluxed for 3 hours, then evaporated under reduced pressure at room temperature (finally by co-distillation with dry benzene to remove the last trace of thionyl chloride).

The syrupy residue of mono acid chloride was dissolved in dry ether (300 ml.) and added to a stirred ice-cold mixture prepared from 6-aminopenicillanic acid (30 g.), water (275 ml.), ether (150 ml.), and N sodium hydroxide solution (135 ml.). The mixture was stirred for 30 minutes, then the aqueous phase was adjusted to pH 2 by addition of dilute hydrochloric acid and the layers were separated. The ether solution was washed with ice-cold water saturated with ether (8×300 ml.) in order to remove phenylmalonic acid, and then the penicillin present was extracted into water to which sufficient dilute sodium hydroxide had been added to bring the aqueous phase to pH 7. Evaporation of the aqueous solution at low temperature and pressure, followed by drying the residual white powder in a vacuum desiccator, left the crude disodium salt of α-carboxybenzylpenicillin (33.3 g.).

In several such runs the weight yields ranged from 46% to 60% and the purities as estimated by colorimetric assay with hydroxylamine ranged from 50% to 63%. Quantitative paper chromatography indicated contamination with from 1% to 5% of benzylpenicillin. If desired, this contamination could be reduced to less than 0.1% by incubation with E. coli amidase.

EXAMPLE 4

α-Carboxybenzylpenicillin

Phenylmalonic acid (0.9 g.) was dissolved in pure dioxan (0.9 ml.) at 75°, treated with thionyl chloride (1 ml.), and heated at 70° for 2½ hours by which time gas evolution had practically ceased. Evaporation in vacuo left the crude bis acid chloride as a pale yellow oil.

The oily bis acid chloride dissolved in dry acetone (10 ml.) was added at about 10° to a stirred solution of 6-aminopenicillanic acid (1.08 g.) in N sodium bicarbonate solution (15 ml.) and acetone (5 ml.). There was an immediate vigorous evolution of gas and the temperature rose to 20°. Stirring was continued for 30 minutes at room temperature, then the neutral solution was evaporated at low temperature and pressure to leave a crude orange-brown solid (2.19 g.).

A portion of this material was subjected to paper chromatography, whereupon zones of antibacterial activity were revealed indicating the presence of α-carboxybenzylpenicillin as well as benzylpenicillin and 6-aminopenicillanic acid.

EXAMPLE 5

α-Carboxypentylpenicillin n-Butylmalonic acid (4 g.) in dry dioxane (4 ml.) was mixed with thionyl chloride (3.8 ml.) and heated for 1 hour at 50° and then for 0.2 hour at 60°. Volatile matter was removed by gentle warming in vacuo to leave the crude oily mono acid chloride.

This intermediate was dissolved in dry acetone (60 ml.) at −30° and added to a stirred solution prepared from 6-aminopenicillanic acid (5.95 g.), N sodium bicarbonate solution (60 ml.) and acetone (60 ml.) which had been pre-cooled to −10°. The mixture was stirred for 0.5 hr. without further cooling, then concentrated under reduced pressure to remove the acetone. The aqueous concentrate was treated with dilute hydrochloric acid to bring it to pH 2, then immediately extracted with ether. The ether extracts were combined and themselves extracted with water to which was added sufficient sodium bicarbonate to give a neutral aqueous phase (pH 7).

Evaporation of the neutral aqueous extracts at low temperature and pressure, followed by drying the residue in a vacuum desiccator, gave the crude disodium salt of α-carboxypentylpenicillin as a pale buff-colored solid (7.79 g.). Colorimetric assay with hydroxylamine indicated a purity of about 40%, while paper chromatography revealed the presence of some contaminating pentylpenicillin.

EXAMPLE 6

α-Carboxy-3-thienylmethylpenicillin 3-thienylmalonic acid (0.93 g.) in pure dioxan (1 ml.) was treated with thionyl chloride (1 ml.) and the resulting solution was heated in a bath at 50° for 1 hour, and finally at 60° for 20 minutes. Volatile matter was removed in vacuo at room temperature to leave a reddish oil having an I.R. spectrum consistent with that expected for the mono acid chloride.

The above freshly prepared acid chloride was dissolved in dry acetone (10 ml.), cooled to −30°, and added to a stirred and cooled (−10°) solution of 6-aminopenicillanic acid (1.08 g.) in N sodium bicarbonate solution (10 ml.) and acetone (10 ml.). The cooling bath was then removed and the mixture was stirred for 1 hour at room temperature, then concentrated under reduced pressure to remove the acetone. The aqueous concentrate was shaken with ether (20 ml.) and acidified to pH 2 with N hydrochloric acid (6.5 ml.). The layers were separated and the aqueous phase, together with some insoluble oil, were extracted with more ether (10 ml.). The combined ether solutions were then themselves extracted with sufficient aqueous sodium bicarbonate to give an aqueous phase of pH 7. Evaporation of the resulting neutral aqueous solution at low temperature and pressure, followed by drying the residue in a vacuum desiccator, left 0.87 g. of brown solid.

This solid was shown by paper chromatography to contain both the required α-carboxy-3-thienylmethylpenicillin and another antibiotic, presumably 3-thienylmethylpenicillin. These two penicillins were separated on a 10″ by 1″ cellulose column using a solvent system of butanol/ethanol/water. Evaporation of a suitable fraction of the eluate gave 0.22 g. of the sodium salt of α-carboxy-3-thienylmethylpenicillin. Colorimetric assay with hydroxylamine indicated a purity of about 60%.

EXAMPLE 7

α-Carboxy-p-chlorobenzylpenicillin

To p-chlorophenylmalonic acid (2.15 g., 1.0 mol) in dry ether (40 ml.) was added thionyl chloride (1.25 g., 1.05 mol) and 2 drops of dimethylformamide and the solution refluxed for 3 hours. Solvent was removed at ca. 2 mm./20°, the crude acid chloride dissolved in dry ether (30 ml.) and the solution added dropwise during 6 minutes at 20°, with vigorous stirring, to a solution of 6-aminopenicillanic acid (2.16 g., 1.0 mol), in phosphate buffer (50 ml.) at pH 6, covered with a layer of ether (30 ml.). During the addition, the pH of the reaction mixture was kept between 5 and 6 by the dropwise addition of N sodium hydroxide. After stirring the reaction mixture at pH 5 for 15 minutes, the aqueous layer was separated and the penicillin purified by extraction at pH 2 into ether (50 ml.) at 0–5°, followed by reextraction into water at pH 7. Evaporation of the aqueous solution (at ca. 2 mm./30°) gave a sodium salt (1.45 g., hydroxylamine assay, 58%), but paper chromatography showed the presence of both the required α-carboxypenicillin and p-chlorobenzylpenicillin with a higher $R_f$ value. The latter was removed by treatment of the sodium salts (1.0 g.) with the amidase, E. coli acylase, at pH 7 at 37° for 1 hour. Again the penicillin was purified via the free acid and evaporation of the final aqueous solution gave the sodium salt of α-carboxy-p-chlorobenzylpenicillin (0.68 g., hydroxylamine assay, 41%). Paper chromatography confirmed the homogeneity of this antibiotic.

EXAMPLE 8

α-Carboxy-p-methoxybenzylpenicillin

As described in Example 7, the crude acid chloride was prepared from p-methoxyphenylmalonic acid (6.2 g., 1.0 mol) and thionyl chloride (3.8 g., 1.05 mol) in dry ether (120 ml.) and an ethereal solution (80 ml.) was used to acylate a solution of 6-aminopenicillanic acid (6.4 g., 1.0 mol) in water (100 ml.) buffered at pH 5 to 6. After purification via the free acid at 0 to 5° (pH 2), paper chromatography of the sodium salt (7.0 g., hydroxylamine assay, 48%) again showed the presence of both the required α-carboxypenicillin and p-methoxybenzylpenicillin. The latter was removed by treatment of an aqueous solution of the sodium salt (3.0 g., C=10 mg./ml.) buffered at pH 7, with the amidase at 37° for 3 hours. Purification of the penicillin via the free acid and evaporation of the aqueous solution at pH 7 gave the sodium salt of α-carboxy-p-methoxybenzylpenicillin (1.5 g., hydroxylamine assay, 38%). Paper chromatography showed that only a single antibiotic was present.

EXAMPLE 9

α-Carboxy-p-benzyloxycarbonylaminobenzylpenicillin

Treatment of p-aminophenylacetic acid with an excess of isopropyl magnesium bromide followed by powdered solid carbon dioxide gave crude p-aminophenylmalonic acid, M.P. 198 to 202° (decomp.). This was treated with benzyl chlorocarbonate and aqueous alkali to give p-benzyloxycarbonylaminophenylmalonic acid, M.P. 142 to 143° (decomp.).

Following the procedure of Example 7 this acid (1 g.) was treated with thionyl chloride (0.39 g.) in ether to yield the crude mono acid chloride, which in turn was coupled with 6-aminopenicillanic acid (0.66 g.) in a two-phase system buffered at pH 5 to 6. Paper chromatography of the resulting crude sodium salt (0.85 g.) revealed the presence of both α-carboxy-p-benzyloxycarbonylaminobenzylpenicillin and p-benzyloxycarbonylaminobenzylpenicillin.

EXAMPLE 10

α-Carboxy-p-aminobenzylpenicillin

The crude mono acid chloride prepared as in Example 9 was treated with benzyl alcohol to give α-benzyloxycarbonyl-p-benzyloxycarbonylaminophenylacetic acid, M.P. 121 to 124°. Treatment of this acid (420 mg.) with thionyl chloride (130 mg.) in ether as in Example 7 gave crude α-benzyloxycarbonyl - p - benzyloxycarbonylaminophenylacetyl chloride.

This product was dissolved in methylene chloride (8 ml.) and added during 10 minutes at 20° to a stirred solution of 6-aminopenicillanic acid (220 mg.) and triethylamine (300 mg.) in methylene chloride (5 ml.). The mixture was stirred at 20° for 1 hour, then the product was extracted into water at pH 8.5 and the penicillin purified via the free acid (pH 1.9). However, paper chromatography of the sodium salt (250 mg.) showed the presence of both the required α-benzyloxycarbonyl-p-benzyloxycarbonylaminobenzylpenicillin and of p-benzyloxycarbonylaminobenzylpenicillin.

Catalytic hydrogenation of this penicillin mixture was effected in aqueous solution at room temperature and pressure using as catalyst a large excess of 5% palladium on calcium carbonate. The resulting mixture of α-carboxy-p-aminobenzylpenicillin and p-aminobenzylpenicillin was treated with the amidase, E. coli acylase, at 37° for 6 hours in order to convert the p-aminobenzylpenicillin into 6-aminopenicillanic acid and leave α-carboxy-p-aminobenzylpenicillin as the only highly active antibiotic present.

EXAMPLE 11

α-Carboxy-m-hydroxybenzylpenicillin

Treatment of m-hydroxyphenylacetic acid with an excess of isopropyl magnesium bromide followed by powdered solid carbon dioxide gave crude m-hydroxyphenylmalonic acid as a gum. This was treated with benzyl chlorocarbonate and aqueous alkali to give m-benzyloxycarbonyloxyphenylmalonic acid, M.P. 133°.

Following the procedure of Example 7 this acid (100 mg.) was treated with thionyl chloride (38 mg.) in ether to yield the crude mono acid chloride, which in turn was coupled with 6-aminopenicillanic acid (66 mg.) in water (5-ml.) buffered at pH 5 to 6. Isolation as in previous examples gave a mixture of the sodium salts of α-carboxy-m - benzyloxycarbonyloxybenzylpenicillin and m-benzyloxycarbonyloxybenzylpenicillin, the latter having a higher $R_f$ value on paper chromatography.

Treatment with amidase at 37° for 1 hour degraded the decarboxylated penicillin and the residual α-carboxy-m-benzyloxycarbonyloxybenzylpenicillin was then hydrogenated in neutral aqueous solution at ordinary temperature and pressure using an excess of 5% palladium on calcium carbonate as catalyst. Paper chromatography indicated the formation of a new zone of antibiotic activity attributed to α-carboxy-m-hydroxybenzylpenicillin.

What is claimed is:
1. α-(Benzyloxycarbonyl)benzylpenicillin.
2. The sodium salt of α-(benzyloxycarbonyl)benzylpenicillin.

References Cited
UNITED STATES PATENTS 3,078,268   2/1963   Doyle et al. _____ 260—239.1

OTHER REFERENCES

Ferguson, Textbook of Organic Chemistry, pp. 362–363 (1965).

NICHOLAS S. RIZZO, Primary Examiner

U.S. Cl. X.R.

260—999